United States Patent [19]

Lewis

[11] Patent Number: 5,123,846
[45] Date of Patent: Jun. 23, 1992

[54] GEOGRAPHY GAME KIT AND METHOD OF PLAYING

[76] Inventor: Betty C. Lewis, P.O. Box 222, Farmville, N.C. 27828

[21] Appl. No.: 640,896

[22] Filed: Jan. 14, 1991

[51] Int. Cl.$^5$ .................. G09B 25/06; G09B 29/00
[52] U.S. Cl. .................. 434/130; 434/150; 273/254; 273/157 R
[58] Field of Search .................. 434/130, 150, 153; 273/254, 157 R

[56] References Cited

U.S. PATENT DOCUMENTS

| | | | |
|---|---|---|---|
| 650,320 | 5/1900 | Hepfinger | 434/150 |
| 1,745,946 | 2/1930 | Murray | 434/130 |
| 2,004,241 | 6/1935 | Hamilton | 434/150 |
| 2,199,499 | 5/1940 | Kreitler | 434/150 |
| 3,711,966 | 1/1973 | Drcsak | 434/150 |
| 3,767,203 | 10/1973 | Eaker | 434/150 |
| 4,674,752 | 6/1987 | Brothers | 273/254 |
| 4,846,691 | 7/1989 | Acosta | 434/259 |
| 4,937,181 | 6/1990 | Rogers | 434/150 |
| 4,940,239 | 7/1990 | Tuttle | 273/243 |
| 5,009,430 | 4/1991 | Yuhasa | 273/255 |

OTHER PUBLICATIONS

"International Learning Corporation", Catalog, Mar. 1979, Euro-card, a novel academic game.

Primary Examiner—John G. Weiss
Assistant Examiner—Cindy A. Cherichetti
Attorney, Agent, or Firm—Rhodes, Coats & Bennett

[57] ABSTRACT

The present invention entails a geography game kit that is designed for teaching children and others the identity and location of counties within a particular state, the county seat of respective counties, and general information and history concerning the counties and the state. In particular, the geography game kit includes a puzzle board that includes a back panel having a raised state shaped outline extending around the back panel that conforms to the shape of a particular state. There is also provided a plurality of county puzzle pieces that conform to or represent the shape of the respective counties constituting the particular state. In addition, the game kit comprises a series of question and answer cards that relate to information about the respective counties and state. Finally, the geography game kit of the present invention includes a timer and at least one die that is used to determine which player begins play. During the course of the game, each respective player attempts to identify and correctly place respective county puzzle pieces onto the back panel and the players are awarded points for correctly identifying and placing puzzle pieces, identifying county seats, and correctly questions found of the question and answer cards.

3 Claims, 1 Drawing Sheet

GEOGRAPHY GAME KIT AND METHOD OF PLAYING

FIELD OF THE INVENTION

The present invention relates to games and more particularly to teaching games and still more particularly to a geography game kit.

BACKGROUND OF THE INVENTION

A child is generally taught geography in a classroom environment. Because of the many counties, cities and states, etc., this process of learning and memorization can be very tedious and boring for young children. Also, it is appreciated that it is especially difficult for children to retain what is taught in the classroom without the self discipline needed for individual studies.

Therefore, there is a need for an alternative learning process by which children can learn geography through the utilization of a game type teaching aid that is fun and amusing to children. It stands to reason that if the learning process can be fun and exciting, then children are more likely to give their complete and undivided attention to such and are more likely to retain what is being taught.

SUMMARY AND OBJECTS OF THE PRESENT INVENTION

The present invention entails a geography game teaching kit that is designed to encourage children and others to learn basic geography with respect to state, counties and county seats, etc. The present geography game teaching kit comprises a structure in the form of a state puzzle having individual counties puzzle pieces. During the course of play, each player is asked to identify a county, arrange the county in its proper location within the state, identify the county seat of the county, and answer a general geographical or historical question concerning the state or county.

It is therefore an object of the present invention to provide a geography game teaching kit that relates state geographical facts and state historical facts.

Another object of the present invention resides in the provision of a geography game teaching kit that facilitates the learning of a state's geography especially the identification of counties, the location of the counties within the state, and the county seats of the respective counties as well as general information about the state and its respective county.

A further object of the present invention resides in the provision of a geography game teaching kit that is in the form of a puzzle where the respective parts of the puzzle constitutes the counties of a state or region.

Other objects and advantages of the present invention will become apparent and obvious from a study of the following description and the accompanying drawings which are merely illustrative of such invention.

DETAILED DESCRIPTION OF THE INVENTION

Figure 1:
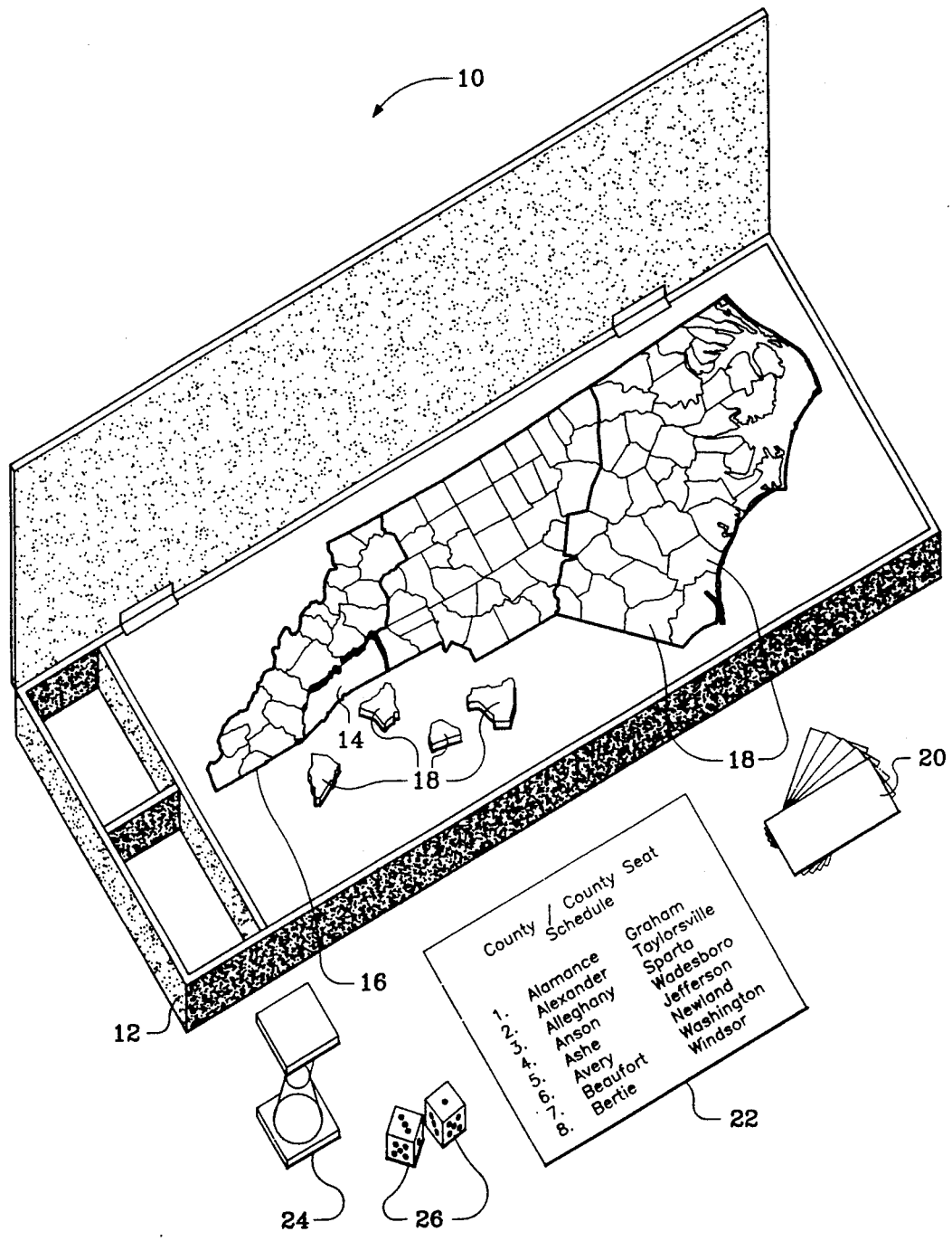

With further reference to the drawings, the geography game teaching kit of the present invention is shown therein and indicated generally by the numeral 10. The geography game teaching kit 10 comprises a container or carrying case 12 that can be constructed of wood or any other suitable material. Formed within the container 12 is a support structure that includes a puzzle back board or panel 14. Surrounding the puzzle back panel 14 is a raised edge outline 16 that in the embodiment illustrated herein depicts an outline of a particular state which happens to be in the case of this disclosure, the state of North Carolina. The puzzle back panel 14 may include a series of intersecting lines that define county areas.

Forming a part of the geography and teaching kit 10 of the present invention is a series of county puzzle pieces with each county puzzle piece being indicated by the numeral 18. Note that each county puzzle piece 18 conforms to the shape of a particular county forming a part of the particular state that is represented by the raised state outline 16 that extends around the puzzle back panel 14. It is appreciated that when all of the county puzzle pieces 18 are properly placed on the puzzle back panel 14 that the state outline is filed with county puzzle pieces.

Also forming a part of the geography game and teaching kit 10 is a stack or series of question and answer cards indicated by the numeral 20. Each question and answer card includes a question and the answer to that question. The subject matter of the questions found on the question and answer cards 20 deals with particular general information and history regarding the various counties, their county seats and the state in general.

In the course of playing the geography teaching game of the present invention, in the case of a state and county version, it is desirable to teach the various county seats of the respective county. Therefore, the geography game and teaching kit 10 of the present invention is provided with a schedule that sets forth the county seat for each county forming the subject matter of the particular state involved. During the course of playing the present game, this county and county seat schedule 22 enables the players to check and make sure that the respective answers given are correct.

Finally, the geography game and teaching kit 10 of the present invention includes a timer 24 and at least one die 26. Because in some modes the game of the present invention is played under time restraints, the timer 24 is needed such that the players can be appraised that the selected time period for their answers has elapsed. The die 26 is used to determine which player is to begin play for a particular game. As will be appreciated from subsequent portions of this disclosure, the timer 24 and die 26 are optional for play.

The geography game and teaching kit 10 of the present invention can be played in various ways under various rules. The following discussion will focus on a number of game modes, but it will be understood that certain rules and approaches to the game may be altered to meet a special need or desire.

In one mode or phase, the die or dice 26 are rolled so as to determine which player begins play. Each player in turn is given three minutes to identify and arrange as many county puzzle pieces 18 as he or she can. The player or team with the greatest number of counties arranged correctly and properly identified is declared the winner.

In a second mode or phase, again the dice 26 is rolled to determine which player or team proceeds first. The first player or team will first identify and arrange on the puzzle back panel 14 as many county puzzle pieces 18 properly identified and arranged on the puzzle back panel 14. A mistake or error by the player results in the player forfeiting his turn and requiring that the particular county puzzle piece involved in the mistake or error be given up and returned to the game board where the same is made available for players in the future. In this mode or phase of the present game invention, each player is allotted three minutes. The game concludes at the end of four turns (or a selected number of turns) and the player with the greatest number of counties identified and placed, with county seats identified, is declared the winner.

A third mode or phase of the present game invention is based on a point system with each player being awarded points for correct identification and arrangements. In this case, one point is granted for a county being correctly placed on its appropriate location on the puzzle back panel 14. Another point is awarded if the county is named correctly. An additional point is granted if the player correctly names the county seat of the particular county. Finally, if the player is able to correctly place the county puzzle piece 18, identify the county, and identify the county seat, then the player is allowed to draw one card from the question and answer card deck 20. If the player answers the question correctly, he or she is awarded three additional points.

This mode or game phase is also played where each player is operating under a three minute time restraint. That is the player must identify the county, place the county, identify the county seat and answer the question from question deck 20 all within three minutes. Once the question from the question and answer card deck 20 has been asked and answered, correctly or incorrectly, then that particular player's turn is terminated and the next player begins. In this phase or mode, the first player reaching a selective score, such as 50, is deemed the winner. In the way of an example, assume that a player chooses a county puzzle piece 18 corresponding to Wake County and identifies the puzzle piece as being "Wake County." That player is awarded one point. Assume further that the player correctly places the puzzle piece 18 that represents Wake County in the proper county location on the puzzle back panel 14. The player is awarded an additional point. Also, assume that the player names the county seat correctly. The player is awarded an additional one point. Now the player has the opportunity to draw a question and answer card from the question and answer card stack 20. Assume that the player incorrectly answers the question presented by the card. There are no points awarded to the player and his turn has terminated, but the player has accumulated three points during this turn because he or she has identified Wake County correctly, has appropriately placed the Wake County puzzle piece 18 onto the puzzle back panel 14 and has correctly identified the county seat. The preferred rule in this phase of the game requires that the player acquire all three points prior to having the opportunity to answer the question and answer card 20. This, of course, means that the player must identify the county, appropriately place the county, and name the county seat before he or she can move onto attempting to draw and answer a question from the question and answer deck 20.

In a fourth phase and mode for the game of the present invention, the die 26 is rolled to determine which player or team proceeds first. The opposing player or team will choose a particular question from the question and answer card deck 20 and the question will be propounded to the player proceeding with his or her turn. If that player is unable to answer the question, then play is moved to the next proceeding player or team. Once there is a change in player turn, then there is likewise change in the player who actually chooses and propounds the question. It should be appreciated that many of the question cards may ask a player to locate a particular county puzzle piece 18 in the appropriate precise area on the puzzle back panel 14. If that is the question or a part of the question, then it follows that the player must correctly do that in order to continue. In this phase or mode of the game, the timer 24 plays a part as each player is given three minutes to respond. In all phases or modes of the geography game teaching kit 10 of the present invention, all questions, once answered correctly, are placed aside and are not used in the present ongoing game. Questions that receive incorrect responses should be returned to the stack and should be propounded at a later time in the game.

In this particular phase or mode, phase or mode 4, the first player or team to reach the score of 50 is declared the winner. Of course, players (especially players of more advanced abilities) can select higher point totals to reach before a winner is declared.

From the foregoing specification and discussion, it is appreciated that the present geography game teaching kit 10 is capable of relating state geographical and historical facts and functions to teach the names and locations of various counties or other geographical units to children as well as adults. It is appreciated that repeated use and play of the present game instills in the player knowledge concerning facts relating to geographical and historical information concerning the state and its respective counties.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed:
1. A state and county geography kit for teaching children the location of counties within a state, the county seat of each county and general information about the respective counties and state comprising:
  (a) a kit structure including a support structure having a puzzle back panel and a raised state outline extending around the puzzle back panel that conforms in shape to the shape of a particular state;
  (b) a plurality of county shaped puzzle pieces with each county puzzle piece having a shape that conforms to the shape of a specific county forming a part of the particular state for placement on the puzzle back at the location of that particular county within the particular state by a player during such player's turn;
  (c) a timer for limiting the time period that a player has to complete a playing turn or a portion of a turn;
  (d) a series of county question and answer cards that contain questions and answers relating to the counties represented by the puzzle pieces, said questions to be posed to each player during such player's turn either prior to or after placement of a puzzle piece by said player; and
  (e) a county and county seat schedule card forming a part of the kit and including a list of counties of the state and a corresponding list of county seats for each of the counties comprising the state.

2. The geography teaching kit of claim 1 including "chance" means for determining which player begins the game.

3. A method of playing a geograhical puzzle map and card game comprising the steps of:
   a) providing the players with a puzzle board in the shape of a selected state and a plurality of county puzzle pieces in the shape of the individual counties comprising said state;
   b) each player taking a turn including the following steps:
      1) placing as many county puzzle pieces as possible on the puzzle board by each player within a specified time period.
      2) identifying the county represented by the puzzle piece; and
      3) identifying the county seat of the county represented by the puzzle piece;
   c) awarding points to each player for successfully completing such player's turn or a portion of such player's turn;
   d) providing a series of question and answer cards associated with respective county puzzle pieces to said players;
   e) posing a question from a selected question and answer card to a player upon the player's successful completion of a turn or a portion of a turn; and
   f) awarding bonus points to such player for each correctly answered question.

* * * * *